US006266538B1

(12) United States Patent
Waldron

(10) Patent No.: US 6,266,538 B1
(45) Date of Patent: Jul. 24, 2001

(54) ANTENNA FOR THE FOLDING MOBILE TELEPHONES

(75) Inventor: Rupert James Waldron, Reading (GB)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/261,500

(22) Filed: Mar. 3, 1999

(30) Foreign Application Priority Data

Mar. 5, 1998 (GB) ..................................................... 9804712

(51) Int. Cl.[7] ............................... H04B 1/38; H04M 1/00

(52) U.S. Cl. ............................ 455/550; 455/90; 455/575; 343/702; 343/767

(58) Field of Search ..................................... 455/550, 552, 455/553, 575, 90; 343/702, 767

(56) References Cited

U.S. PATENT DOCUMENTS 5,337,061 * 8/1994 Pye et al. ............................. 343/702
5,451,965 * 9/1995 Matsumoto ........................... 343/702
5,542,106 * 7/1996 Krenz et al. ............................ 455/90
5,809,403 * 9/1998 MacDonald, Jr. et al. ............ 455/90
5,945,954 * 8/1999 Johnson ............................... 343/702
5,995,052 * 11/1999 Sadler et al. ......................... 343/702

* cited by examiner

*Primary Examiner*—Nay Maung
*Assistant Examiner*—Temica M. Davis
(74) *Attorney, Agent, or Firm*—Sughrue, Mion, Zinn, Macpeak & Seas, PLLC

(57) ABSTRACT

An antenna for a folding mobile phone comprises two main sections connected by a hinge mechanism. When the mobile phone is in the open position (the normal operating position), the antenna comprises a planar conducting sheet combined with a slotted plate and acts as a monopole. When the mobile phone is in the closed position (the standby position), the antenna comprises the slotted plate acting as a slot antenna with the planar conducting sheet forming a reflector.

10 Claims, 4 Drawing Sheets

ANTENNA FOR THE FOLDING MOBILE TELEPHONES

BACKGROUND OF THE INVENTION

1. Field of the Invention

This invention relates to antennas for use with mobile telephones.

2. Description of the Related Art

The design of antennas for mobile telephones capable of operation in more than one frequency band (dual mode) is constrained by the market demand continually to reduce the overall size of telephones. An antenna for a foldable telephone, or "flip" phone as it called, will need to be especially compact while still being capable of providing satisfactory performance.

A typical foldable phone comprises two main sections connected by a hinge mechanism. When such a telephone is in the closed position, performance of the antenna must be sufficient to enable the satisfactory reception of incoming signals. The phone is normally used in the opened position, but incoming calls as well as text and data messages must be received when the phone is in the closed position.

SUMMARY OF THE INVENTION

It is an object of this invention to provide an antenna for use with a folding mobile phone having satisfactory performance in both the normal operating position and the standby position.

According to this invention, there is provided a dual mode antenna for use with a folding mobile phone, which is switched between the normal operating position and the standby position. In the normal operating position, the antenna acting as a monopole comprises a planar conducting sheet in combination with a slotted plate. And in the standby position the antenna comprises said slotted plate acting as a slot antenna with the planar conducting sheet forming a reflector.

Conveniently the top section of the phone will include a window for providing viewing access to a display screen or direct access to part of a keypad when the phone is in the closed position. The display screen and keypad would usually be located in the bottom section of the phone.

Preferably the antenna will be incorporated into the phone so that the antenna is out of sight of the user.

The above and other objects, features and advantages of present invention will become apparent from the following description with reference to the accompanying drawings which illustrate examples of the present invention.

DESCRIPTION OF THE PREFERRED EMBODIMENT

Figure 1:
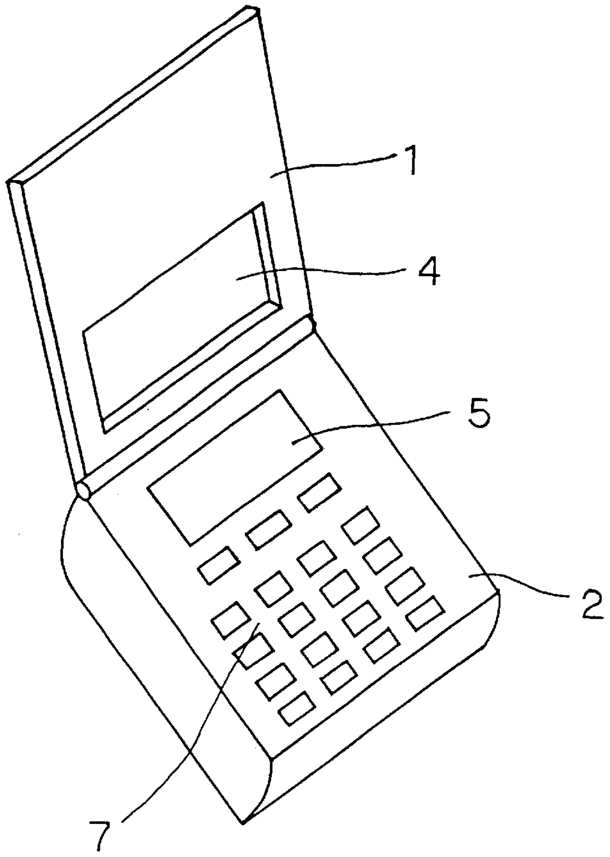
FIG. 1 shows a foldable phone in the normal position.
Figure 2:
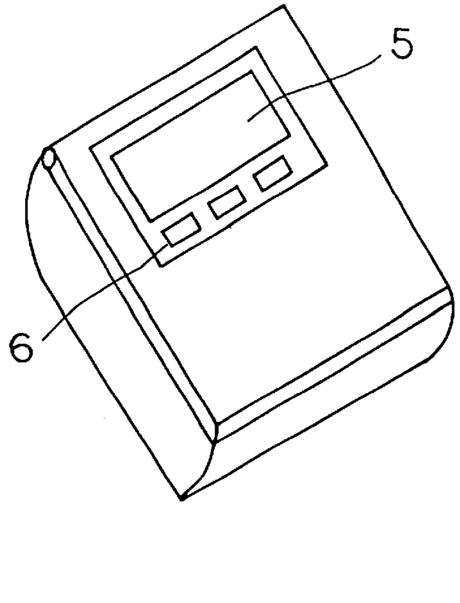
FIG. 2 shows a foldable phone in the standby position.

With reference to FIG. 1, a flip phone is shown in the opened position with a top section 1 of the phone and a bottom section 2 of the phone. An aperture 4 in top section 1 gives access, when the telephone is closed, to the visual display 5 and part 6 of the keypad 7 located in bottom section 2.

Figure 3:
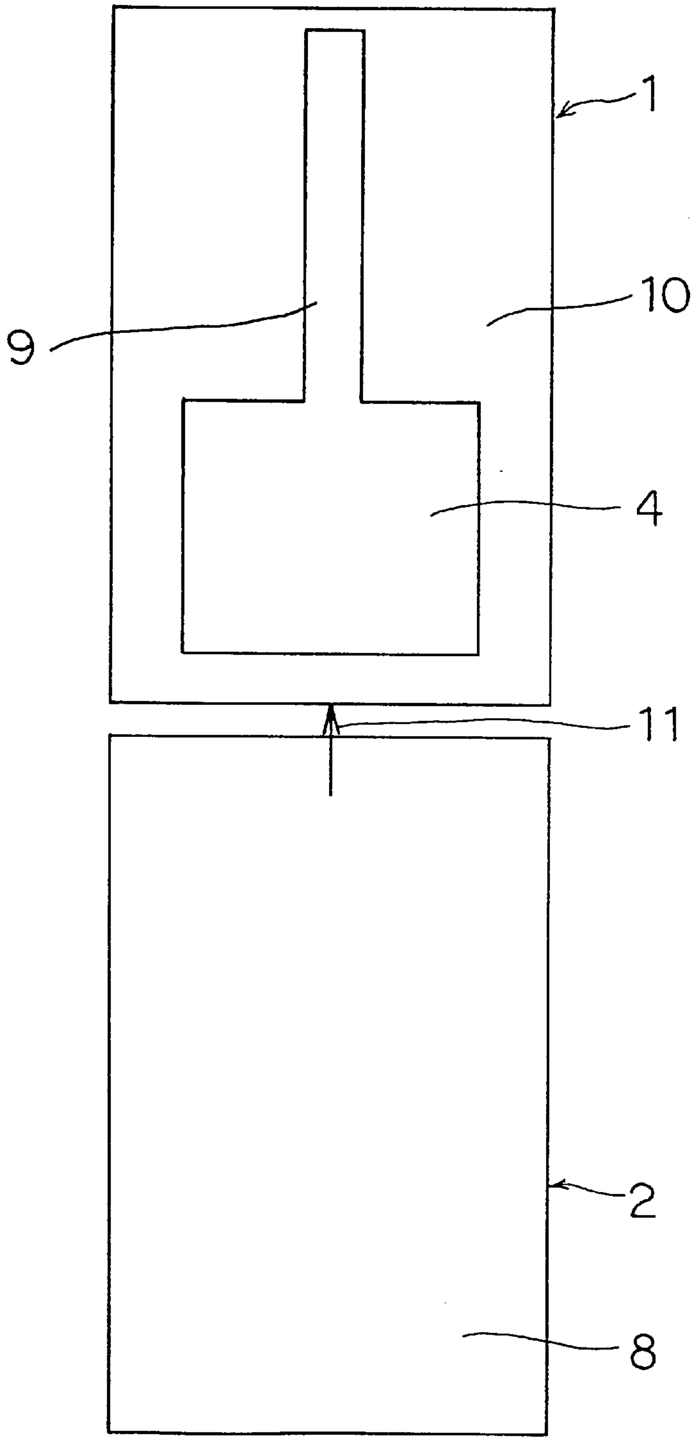
FIG. 3 illustrates the antenna in the open position.

With reference to FIG. 3 which illustrates the antenna in the normal operating position, bottom section 2 of the phone includes a copper sheet 8 whose area is slightly less than that of bottom section 2.

Top section 1 also incorporates a copper sheet 10 but the top section copper sheet has been cut to provide a slot 9 as shown in FIG. 3. The width of part 4 of slot 9 has been increased to form an aperture suitable for access to part of bottom section 2 when the telephone is in the closed position. Where only visual access is required, part 4 of slot 9 in the slotted plate increased to provide access may be filled with a transparent material such as injection molded polycarbonate or polymethyl methacylate (PMMA).

The top section copper sheet 10 in this arrangement is formed on one side of a printed circuit board (PCB). When in the normal operating position (the opened position as illustrated in FIGS. 1 and 3), the antenna comprises the bottom section copper sheet 8 and the top section copper sheet 10 (with slot) in combination, acting as a monopole.

It has been found by experiment that a significant increase in the width of part 4 of slot 9 to provide an aperture for access purposes does not degrade the performance of the antenna significantly. Excitation of the antenna in the normal operating position is done via a coaxial lead across the edges of the two copper sheets 11.

Figure 6:
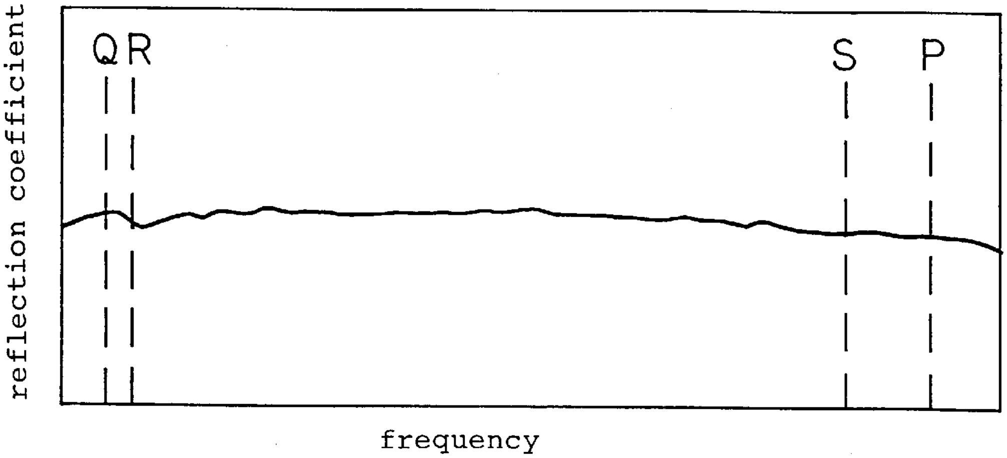
FIG. 6 is a plot of antenna gain for the phone in the open position.

With reference to FIG. 6 which is a plot of the reflection coefficient for the normal operating position, it can be seen that a satisfactory gain is achieved for both frequency bands.

The antenna gains with reference to 0 dBm at the points marked on the plot (FIG. 6) are:

P, −8.8098 dB at the frequency 1.805 GHz

Q, −6.8373 dB at 935 MHz

R, −6.7082 dB at 960 MHz

S, −8.3531 dB at 1.71 GHz

Figure 7:
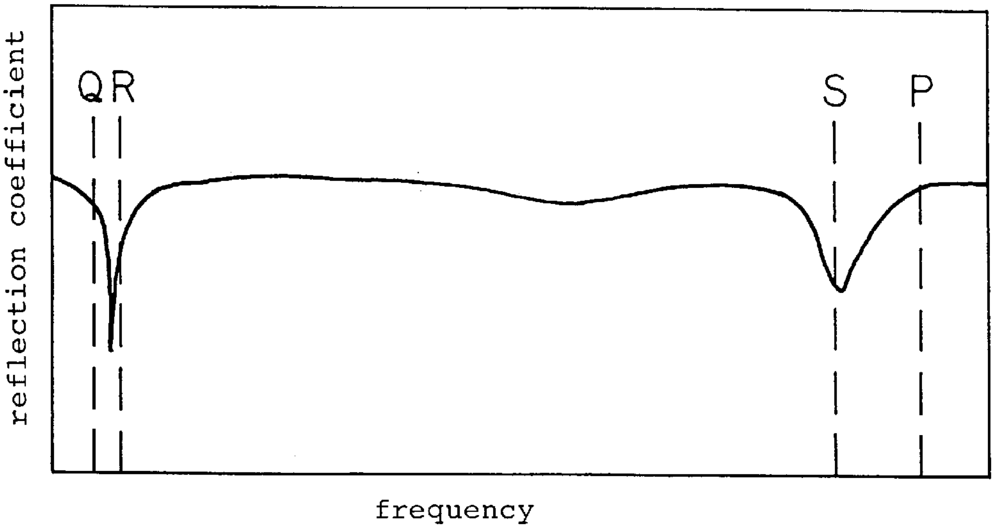
FIG. 7 is a plot of antenna gain for the phone in the closed position.

With reference to FIG. 7 which is a plot of reflection coefficient for the standby position, it can be seen that considerably more variation in reflection coefficient is experienced than for the normal operating position. Nevertheless the performance in the standby position provides satisfactory performance and the reflection coefficients with reference to 0 dBm at the points marked on the plot (FIG. 7) are:

P, −2.6055 dB at the frequency 1.805 GHz

Q, −5.8452 dB at 935 MHz

R, −14.885 dB at 960 MHz

S, −15.903 dB at 1.71 GHz

Figure 4:
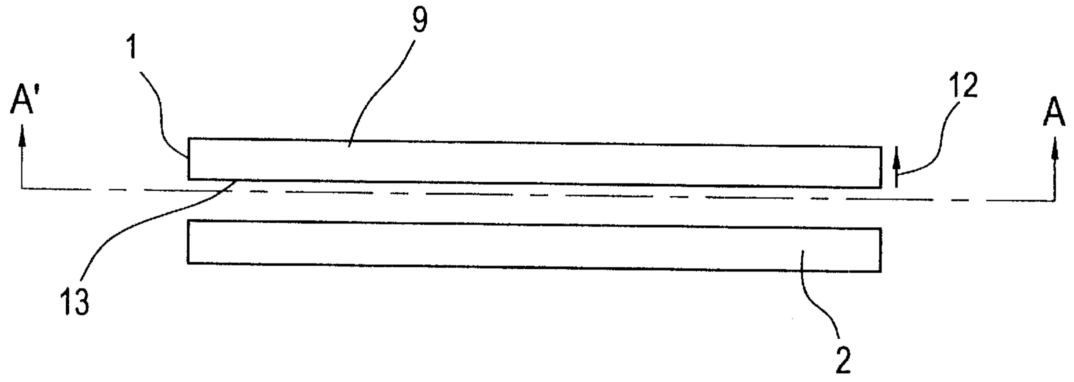
FIG. 4 illustrates the antenna in the closed position.
Figure 5:
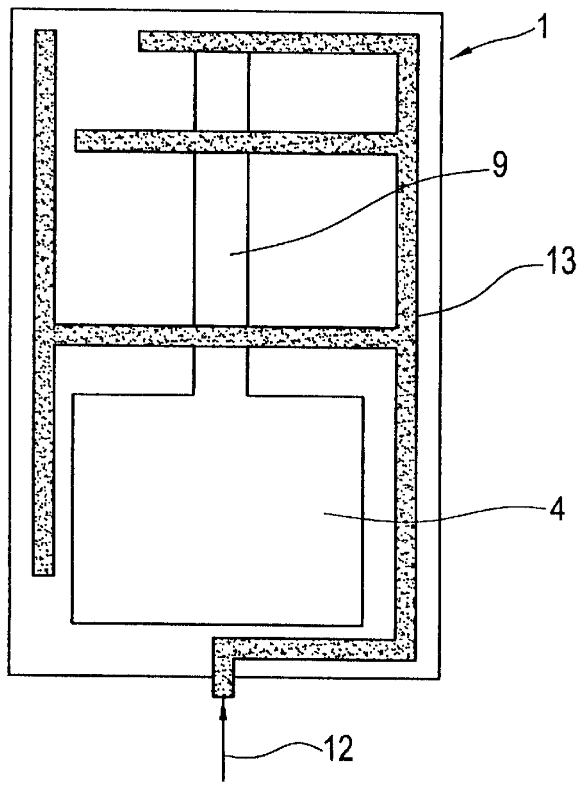
FIG. 5 is a view along A–A' of FIG. 4.

In FIG. 4 a simplified cross-sectional view of the phone in the standby (closed) position is given. The antenna in this closed position operates as a slot antenna by means of slot 9 in top section 1 as shown in FIG. 5. The antenna connection is switched to a feed line 12 when the phone is closed. A microstrip line 13, which can be adjusted to alter antenna resonance, is formed on the other side of the PCB to the slot and provides excitation of slot 9. In the closed position, bottom section 2 does not form part of the antenna but acts as a reflector.

While a preferred embodiment of the present invention has been described using specific terms, such description is for illustrative purposes only, and it is to be understood that changes and variations may be made without departing from the spirit or scope of the following claims.

What is claimed is:

1. A dual mode antenna for use with a folding mobile phone, wherein said antenna is switched between a normal operating position and a standby position, in said normal operating position said antenna acting as a monopole comprises a planar conducting sheet combined with a slotted plate; and in said standby position said antenna comprises said slotted plate acting as a slot antenna with said planar conducting sheet forming a reflector.

2. A dual mode antenna as set forth in claim 1 wherein a width of part of a slot in said slotted plate is increased to provide access to a visual display.

3. A dual mode antenna as set forth in claim 1 wherein a width of part of slot in said slotted plate is increased to provide access to a keypad.

4. A dual mode antenna as set forth in claim 2 wherein the width of part of slot in said slotted plate is increased to provide access to a keypad.

5. A dual mode antenna as set forth in claim 2 wherein part of the slot in said slotted plate increased to provide access is filled with a transparent material.

6. A dual mode antenna as set forth in claim 1 wherein said planar conducting sheet is a metal plating on a printed circuit board.

7. A dual mode antenna as set forth in claim 2 wherein said planar conducting sheet is a metal plating on a printed circuit board.

8. A dual mode antenna as set forth in claim 3 wherein said planar conducting sheet is a metal plating on a printed circuit board.

9. A dual mode antenna as set forth in claim 4 wherein said planar conducting sheet is a metal plating on a printed circuit board.

10. A dual mode antenna as set forth in claim 5 wherein said planar conducting sheet is a metal plating on a printed circuit board.

* * * * *

UNITED STATES PATENT AND TRADEMARK OFFICE

CERTIFICATE OF CORRECTION

PATENT NO. : 6,266,538 B1
DATED : July 24, 2001
INVENTOR(S) : Rupert James Waldron It is certified that error appears in the above-identified patent and that said Letters Patent is hereby corrected as shown below:

Title page,
Item [30]: Priority Data after "9804712" insert -- .9 --

Signed and Sealed this

Second Day of April, 2002

*Attest:*

JAMES E. ROGAN
*Director of the United States Patent and Trademark Office*

*Attesting Officer*